(12) United States Patent
Chebli et al.

(10) Patent No.: US 8,442,670 B2
(45) Date of Patent: May 14, 2013

(54) AUTOMATED SURFACE PREPARATIONS FOR THE INNER SURFACE OF A TIRE

(75) Inventors: Adib Chebli, Greer, SC (US); John Hommerson, Simpsonville, SC (US); Metodi Ikonomov, Moore, SC (US)

(73) Assignee: Michelin Recherche et Technique S.A., Granges-Paccot (CH)

( * ) Notice: Subject to any disclaimer, the term of this patent is extended or adjusted under 35 U.S.C. 154(b) by 241 days.

(21) Appl. No.: 12/744,078

(22) PCT Filed: Nov. 26, 2008

(86) PCT No.: PCT/US2008/084931
§ 371 (c)(1), (2), (4) Date: May 21, 2010

(87) PCT Pub. No.: WO2009/073539
PCT Pub. Date: Jun. 11, 2009

(65) Prior Publication Data
US 2010/0243127 A1 Sep. 30, 2010

(30) Foreign Application Priority Data
Nov. 30, 2007 (WO) ................ PCT/US2007/024679

(51) Int. Cl.
*G06F 19/00* (2011.01)
(52) U.S. Cl.
USPC .......................................... 700/215; 264/334
(58) Field of Classification Search .................. 700/215, 700/275, 258; 528/60; 521/163, 157; 81/15.7, 81/15.2; 264/334
See application file for complete search history.

(56) References Cited

U.S. PATENT DOCUMENTS

| | | | |
|---|---|---|---|
| 3,825,965 A | 7/1974 | Root et al. | |
| 3,953,942 A | 5/1976 | Nisimura | |
| 3,969,327 A * | 7/1976 | Stein et al. | 524/88 |
| 4,157,107 A * | 6/1979 | Cataldo | 152/520 |
| 4,325,852 A * | 4/1982 | Hallenbeck | 523/334 |
| 4,372,366 A * | 2/1983 | Dugger | 157/13 |
| 4,374,210 A * | 2/1983 | Ewen et al. | 521/159 |
| 4,415,013 A * | 11/1983 | Vine | 152/367 |
| 4,434,372 A | 2/1984 | Cleland | |
| 4,836,930 A | 6/1989 | Hill | |
| 4,936,138 A | 6/1990 | Cushman et al. | |

(Continued)

FOREIGN PATENT DOCUMENTS

JP 01-164607 6/1989

OTHER PUBLICATIONS

PCT International Search Report for PCT/US2007/026479, dated Apr. 23, 2008.

(Continued)

*Primary Examiner* — Kidest Bahta
(74) *Attorney, Agent, or Firm* — Dority & Manning, P.A.

(57) ABSTRACT

Automated treatment operations for preparing the inner surface of a tire for patch application is provided. One exemplary method includes the steps of locating the tire on a tire support, identifying a target area for preparing that is located on the inner surface of the tire, scanning the target area so as to acquire data regarding the inner surface of the tire at the target area, determining a treatment path using the data regarding the inner surface of the tire, treating the inside of the tire by removing material using a treatment tool, and positioning the treatment tool along the treatment path during the treating step.

19 Claims, 6 Drawing Sheets

U.S. PATENT DOCUMENTS

| | | | |
|---|---|---|---|
| 4,953,291 A * | 9/1990 | Markow ................... 29/894.351 |
| 5,022,186 A | 6/1991 | Rogers, Jr. |
| 5,139,840 A | 8/1992 | Ferrara |
| 5,179,806 A | 1/1993 | Brown et al. |
| 5,450,887 A * | 9/1995 | Habay et al. .................. 152/520 |
| 5,461,945 A * | 10/1995 | Lee ................................ 81/15.7 |
| 5,485,406 A | 1/1996 | Wada et al. |
| 6,548,616 B1 * | 4/2003 | Schrock et al. ................. 528/60 |
| 6,751,819 B2 * | 6/2004 | Chuang ............................ 7/100 |
| 7,028,732 B1 | 4/2006 | Phelan et al. |
| 7,805,987 B1 * | 10/2010 | Smith ......................... 73/146.5 |
| 2004/0164140 A1 * | 8/2004 | Voeller et al. ................. 235/375 |
| 2005/0274448 A1 | 12/2005 | Lettieri et al. |

OTHER PUBLICATIONS

PCT International Search Report for PCT/US2009/084931, dated May 29, 2009.

\* cited by examiner

AUTOMATED SURFACE PREPARATIONS FOR THE INNER SURFACE OF A TIRE

RELATED APPLICATIONS

The present application is a U.S. national phase filing of PCT/US2008/084931 filed on Nov. 26, 2008.

BACKGROUND OF THE INVENTION

In order to apply a patch to the inside of a tire, various treatments are generally required. While typically a certain amount of tire material or other features must be removed from the inside of the tire, several different preparations are employed depending upon the patch and application. For example, applying a patch requires removal of a non-stick coating from the inner surface of the tire, removal of dirt or debris, removal of a bladder imprint, removal of a sufficient depth of material desired for installing the patch, applying a texture to the surface for receipt of the patch, removal of an old patch or other features, and/or other treatments. As used herein, "patch" shall be understood to include a material being added to the inner surface of the tire for purposes of repair as well as a device carrying various components such as e.g., electronic sensors, RFIDs, etc.

In preparing for patch application, various tools and manual techniques may be used for treating the inside of the tire including blasting with e.g., sand, cryogenic treatment with e.g., carbon dioxide ice, laser ablation, water get blasting, hot knife treatment, and/or grinding with an abrasive material. However, difficulties are encountered with each approach. For example, removal of the inner tire material manually using a grinding tool, e.g., an abrasive wheel or similar tool, can require considerable skill and strength. An operator must react to the torque created by contact between the spinning grinder and the inner surface while controlling the movement of the grinder so that the inner tire material is removed from only a predetermined area having a certain size and shape—referred to herein as the target area. In addition, the depth of material removed must be controlled to ensure that only the desired amount is removed and, typically, to ensure that removal is either uniform over the target area or follows a particular depth profile. Such grinding operations can be particularly challenging when the tire is damaged at the target area or has raised features at the target area. In addition, grinding the inner surface of the tire requires operating the grinding tool inside the tire, which increases the difficulty of such operations due to the narrow space available. Not only must the grinding tool be able to fit inside the tire, but manual operations also require that an operator be able to manipulate the grinding tool therein. Automating the grinding process faces additional problems including repeatedly positioning the grinder at the proper location within tires that vary in geometry, dimensions, and surface features between different models and sizes. Similar problems are also encountered with the other tools and manual techniques referenced above.

Therefore, advantageous solutions that allow for automation and other improvements in treatment preparations for patch application along the inside of various tires are needed. Advantageous solutions that can be used with a variety of tools and treatment techniques as mentioned above would be particularly beneficial.

SUMMARY OF THE INVENTION

A summary of exemplary embodiments and methods of the present invention will be set forth here. Using the description provided herein, one skilled in the art will understand that additional exemplary embodiments and methods are within the scope of the present invention.

In one exemplary aspect of the present invention, a method for preparing the inside of a tire is provided and includes the steps of locating the tire on a tire support, identifying a target area for preparing that is located on the inner surface of the tire, scanning the target area so as to acquire data regarding the inner surface of the tire at the target area, determining a treatment path using the data regarding the inner surface of the tire, treating the inside of the tire by removing material using a treatment tool, and positioning the tool along the treatment path during the treating step.

Variations to this method are within the scope of the present invention. For example, the positioning step can include rotating the tire by a predetermined amount. The step of determining a treatment path may include applying dimensional information regarding a patch to be applied to the inside of the tire at the target area. A step for determining whether the tire is skewed relative to the treatment tool may be added. A step of clamping the tire to a tire support to thereby spread at least one bead of the tire. A step for inserting a shim between the tire and the tire support. A step of acquiring reference data regarding the physical dimensions of the tire from, for example, an operator or a database may be included for use in determining the treatment path. The treatment path may also be determined by applying information regarding the depth and profile of material to be ground from the inside of the tire and/or dimensional information regarding the treatment tool. The target area for the treatment path may include a feature that is to be removed from the inside of the tire. The target area may be identified with reference to the distance from at least one bead of the tire. A variety of treatment tools and techniques may be used for treating the inside of the tire including blasting with e.g., sand, cryogenic treatment with e.g., carbon dioxide ice, laser ablation, water jet blasting, hot knife treatment, and/or grinding with an abrasive material. A mapping step may be included so as to provide dimensional information regarding the tire for use during the scanning step (a description of exemplary methods for scanning and exemplary methods for mapping are provided below).

In another exemplary embodiment, the present invention includes an apparatus for preparing the inside of a tire. Such exemplary apparatus includes a treatment tool, a surface measuring device, a transport device configured for carrying and positioning the treatment tool and the surface measuring device relative to the inner surface of the tire, a tire support configured for receipt of the tire, and a clamp for locating a tire on the tire support.

In another exemplary embodiment, the present invention includes a computer program for operating a machine according to the methods of the present invention as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE PREFERRED EMBODIMENTS

Objects and advantages of the invention will be set forth in the following description, or may be apparent from the description, or may be learned through practice of the invention. The figures illustrate an exemplary embodiment that may be used to practice the present invention. Using the teachings disclosed herein, it should be understood that the present invention is not limited to the exemplary embodiment of the figures and other embodiments may be utilized.

As used herein, "target area" refers to a portion of the inside of a tire that is intended for preparation such that e.g., a patch can be applied. Such preparation may include treating the inside surface of the tire, treating one or more layers below the inside surface of the tire, and/or removal of material from the inside of the tire in a variety of different shapes and dimensions. For example, the target area can be a portion on the inside of the tire that is being textured for patch application and can include an area where any amount of material is being removed in a variety of shapes and depths as desired depending upon the application. As such, the identified target area may represent a damaged area of the tire where a patch will be applied, a position where a patch with features (e.g., electronic sensors) will be applied, or a location where another feature (e.g., a patch) is to be removed. Multiple target areas may be identified for a single tire.

As used herein, "scanning" refers to the collection of physical data regarding the inside of a particular tire.

As used herein, "mapping" refers to the collection of physical data regarding the inside of a typical tire for purposes of reference when scanning the same tire or tires of the same or similar size and/or model.

Figure 1:
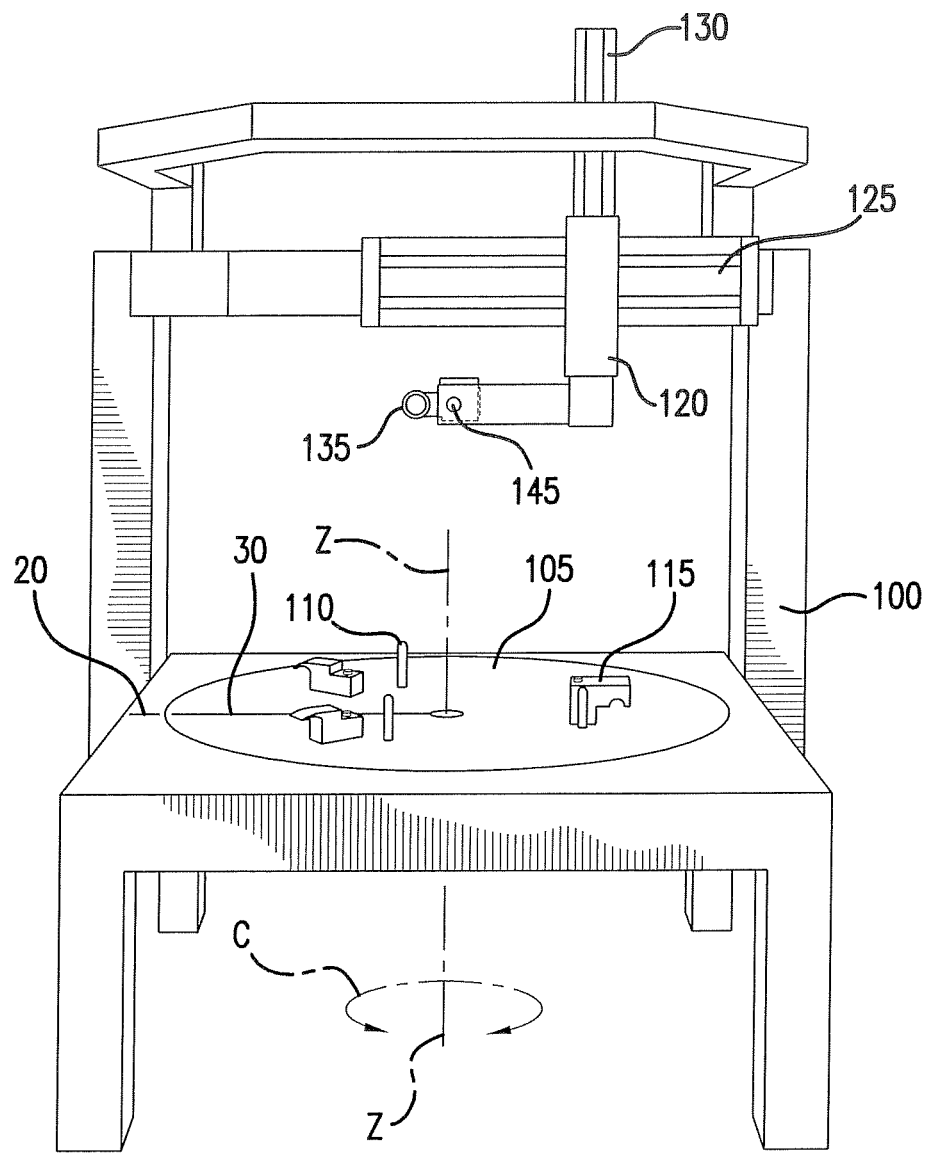
FIG. 1 is a perspective view of an exemplary embodiment of the present invention.
Figure 2:
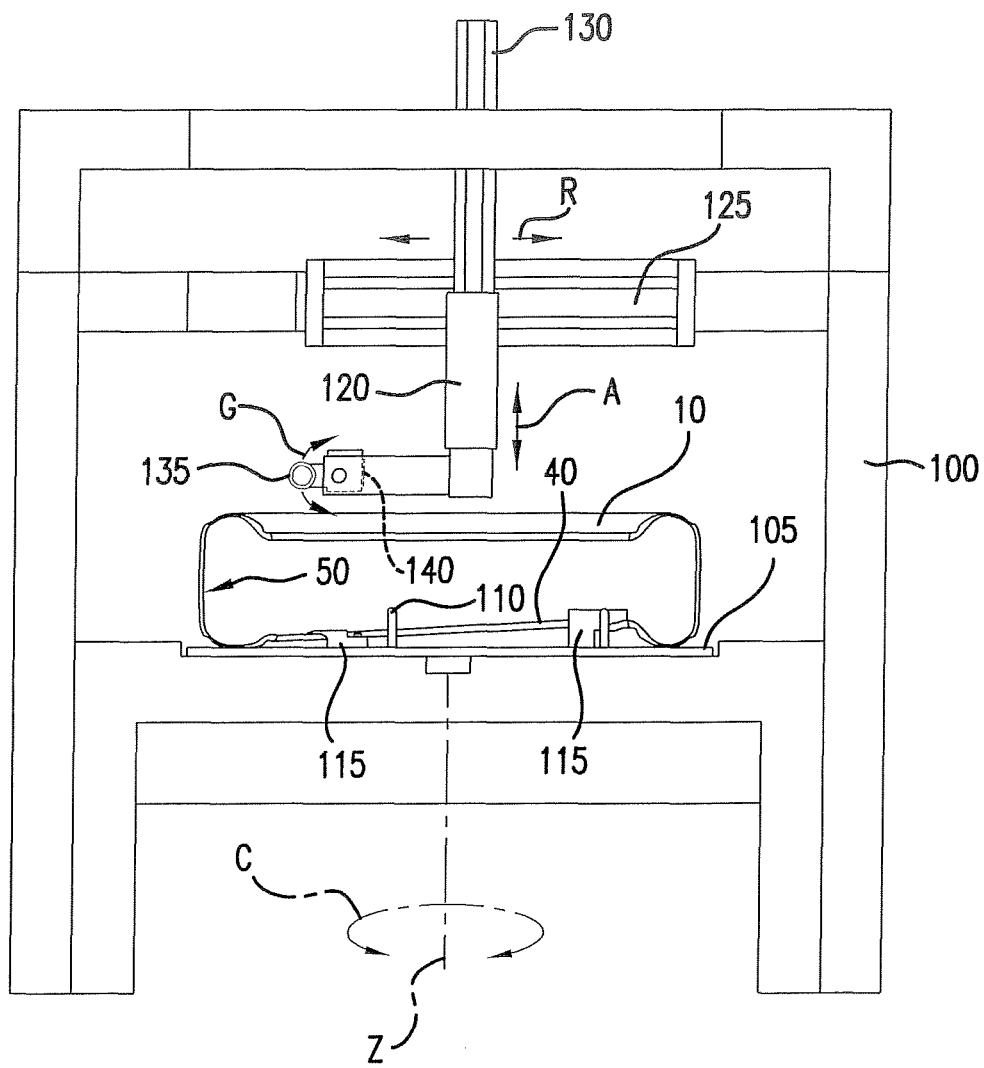
FIG. 2 is an elevation view of the exemplary embodiment of FIG. 1 with directional arrows to show certain moveable elements, and a tire shown in cross-section.

Referring now to FIGS. 1 and 2, frame 100 includes a rotatable tire support 105 upon which a tire 10 is positioned. Tire support 105 can be rotated in either direction about axis Z-Z such that tire 10 can be rotated along its circumferential directions C. For example, tire support 105 may be driven by a servo motor linked to a controller (not shown) to position tire 10 as desired circumferentially. Reference lines 20 and 30 provide indicia that can be used to orient tire 10 at a particular position circumferentially upon support 105 and to observe the amount of circumferential rotation as line 30 moves relative to line 20 along the circumferential directions C of tire 105. Specifically, a target area on the inner surface 50 of tire 10 intended for grinding operations can be centered directly over reference line 30 at the beginning of such operations. Tire support 105 also includes adjustable positioning pins 110 and clamps 115, 116, and 117 for the receipt of tire 10. For example, pins 110 assist with centering tire 10 properly upon tire support 105 while clamps 115-117 are used to secure tire 10 into place once properly positioned. Clamps 116 and 117 are used to spread open the tire 10 by pulling against the bead 40 of tire 10 (FIG. 2). The desired target area is positioned between clamps 116 and 117. The relative positions of pins 110 and clamps 115-117 may be adjusted for various sizes of tire 10 by, for example, providing a series of apertures on support 105 into which pins 110 and clamps 115-117 may be repositioned. Other positioning mechanisms may be used with the present invention as well. By way of example, additional clamps may be included so that both beads of the tire 10 are clamped and/or pulled apart to further spread open the tire 10.

Figure 7:
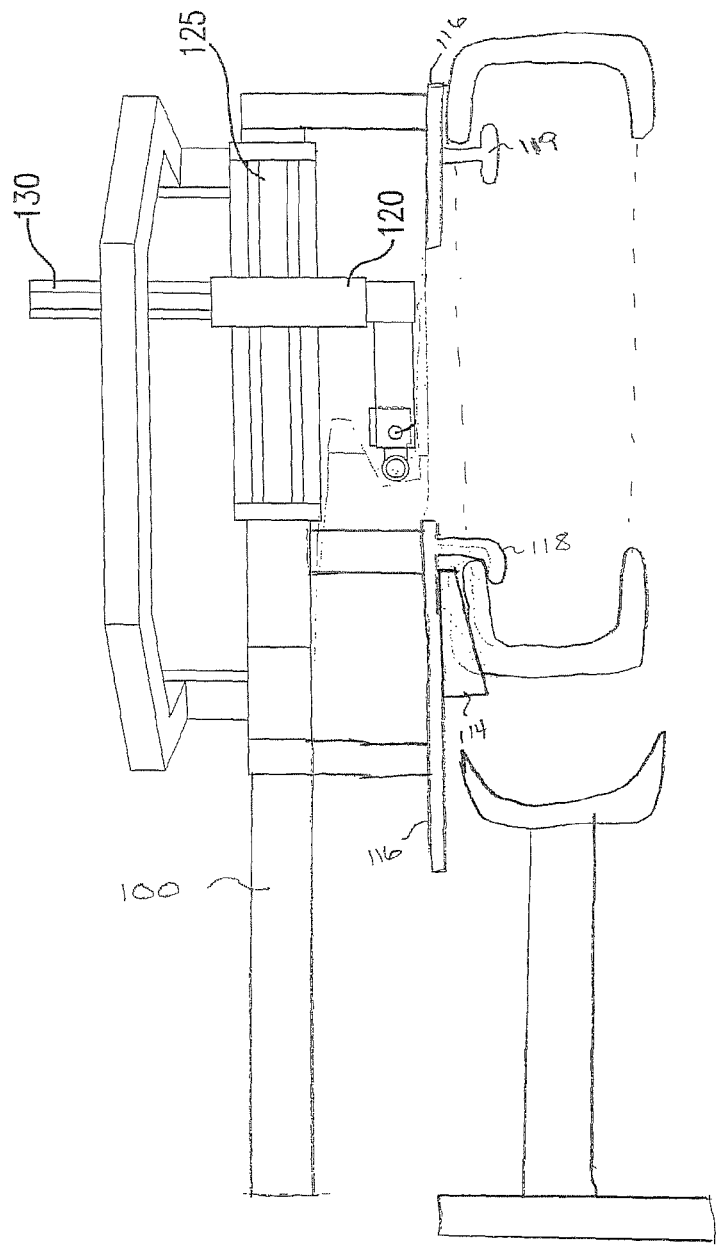
FIG. 7 is a perspective view of an exemplary embodiment of the present invention.

In another embodiment as shown in FIG. 7, the frame 100 holds the tire in a vertical orientation. This orientation allows the utilization of overhead conveyors, pulley systems and other known methods of moving tires. A pedestal moves the tire vertically into position to be supported by a pair of rollers 119. The rollers 119 support the weight of the tire and position the tire to allow accessibility of the treatment tool. A clamp 118 locates and clamps the tire to the working surface or tire support 116. After the tire has been clamped to the tire support 116, the pedestal may be withdrawn from the tire. A tire support 116 with the center portion removed supports the side of the tire to resist lateral movement of the tire due to clamping or treating.

Figure 3:
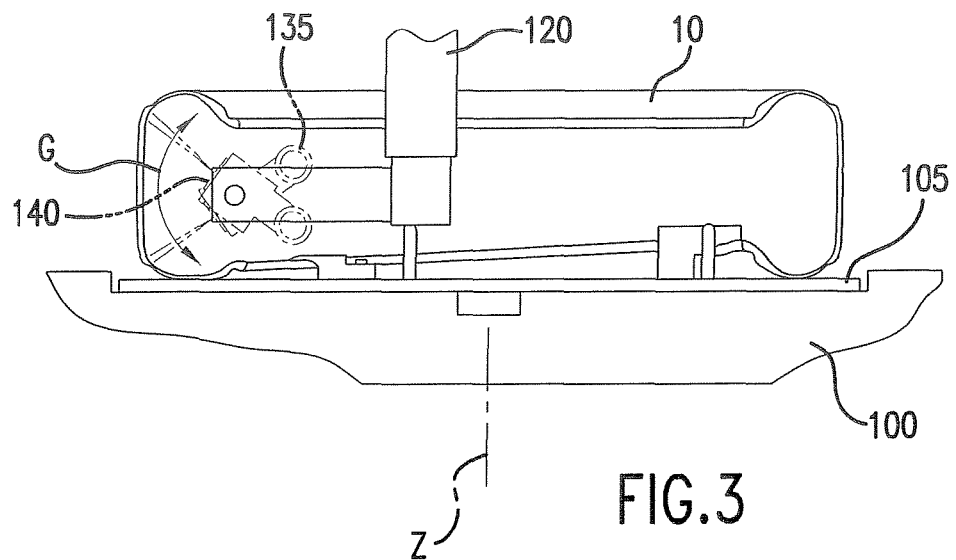
FIG. 3 and FIG. 4 are cross-sectional views of the tire illustrating scanning and tire treatment operations (e.g., grinding) using the exemplary embodiment of FIGS. 1 and 2.
Figure 4:
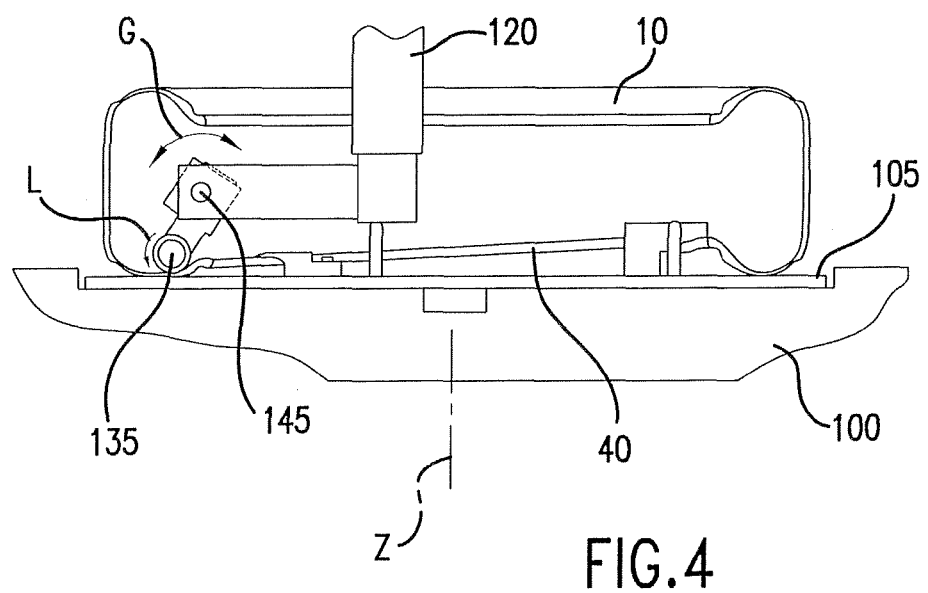

Continuing with FIGS. 1 and 2, frame 100 also supports a transport device 120 that is movable along both the axial directions A and radial directions R of tire 10. Transport device 120 includes tracks 125 and 130. Servos linked to a controller are used to move transport device 120 along tracks 125 and 130 so that positioning relative to tire 10 may be precisely determined. Transport device 120 carries both a treatment tool, e.g. grind unit 135, and a surface measuring device 140. Grind unit 135 and device 140 are rotatable about an axis 145 (FIGS. 1 & 4) as illustrated by arrows G (FIGS. 2, 3, and 4). Rotation about axis 145 allows for positioning either grind unit 135 or surface measuring device 140 adjacent to the inner surface 50 of tire 10 and for controlling the relative movement of grind unit 135 during grinding operations. For example, rotation about axis 145 may be precisely controlled by a servo linked to a controller. Grind unit 135 and surface measuring device 140 are shown oriented 180 degrees from each other about axis 145 but numerous other relative orientations may be employed. Similarly, while the figures illustrate the use of grind unit 135, numerous other tools and techniques including those previously identified may be used as a treatment tool in lieu of grind unit 135.

Figure 8A:
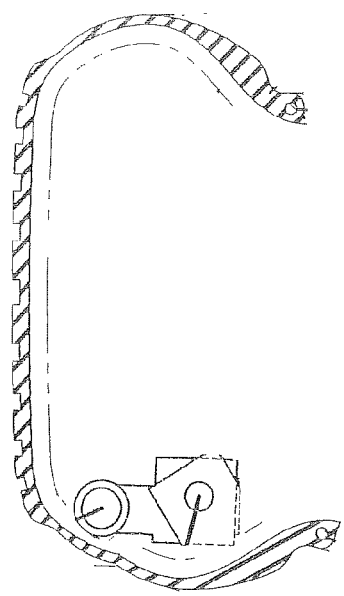
FIGS. 8a and 8b are cross-sectional views of the tire illustrating scanning and tire treatment operations using the exemplary embodiments of FIGS. 1 and 7, respectively.

In cases where the apparatus and method are used to treat smaller tire sizes and/or tires with short sidewalls, the inside contour of the tire may be such that an interference occurs with the scanning and treatment tool. As shown in FIG. 8a with the original setup, the tool may hit the wall of the tire and inhibit the treatment of the target area. The original setup provides a clamping surface perpendicular to the axis of the tire. The action of clamping the tire to the working surface provides some spreading of the tire. Spreading of the tire is an increase in the spacing between the beads of the tire.

Figure 8B:
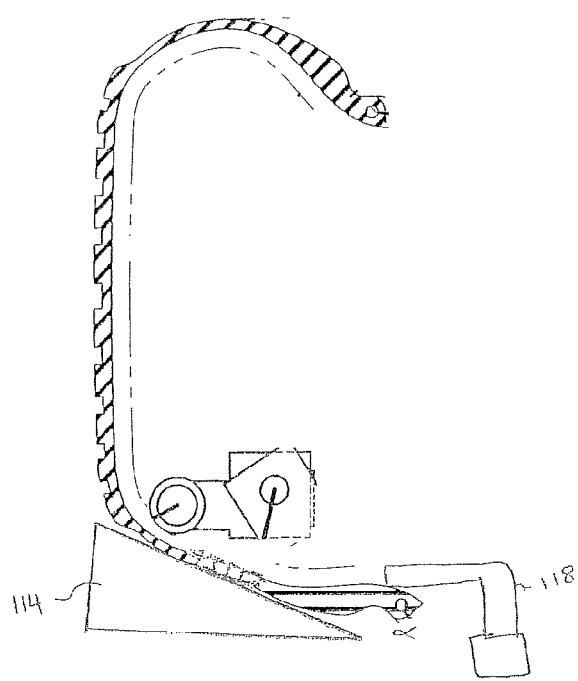

In order to prepare the surfaces of the broadest range of tires, an improved embodiment comprises a clamp 118 and a shim 114 that are used to spread the tire further as shown in FIG. 8b. Introducing a shim with an outward angle a between the tire and the tire support spreads the tire further than the clamp alone. The working surface of the shim which is in contact with the tire is angled outward relative to the tire. A clamp 118 fits over the bead area and pulls the tire to the shim 114 flattening the curvature of the tire and providing additional bead spreading to allow the treatment tool easy access to the inner surface of the tire. Optionally, more than one clamp may be used to hold and spread the tire for given embodiments.

The shim could be any suitable shape, i.e. rectangular, triangular, as long as its working surface provides the necessary angle for flattening the curvature of the tire. In a particular embodiment of the present invention, a triangular shim is used with a working angle of about 11 degrees.

The shim may be used with any embodiment of the present invention. For example, the shim may be used with the vertical orientation as shown in FIG. 7. It can also be used on the horizontal tire support in FIG. 1 (shim not shown). In both examples, the shim is used to create an angle between the tire and the working surface or tire support.

A variety of equipment may also be used for surface measuring device 140. For the exemplary embodiments of FIGS. 1 through 8, surface measuring device 140 includes a laser sensor that can be used to map and/or scan the inner surface 50 of tire 10. More specifically, as shown in FIG. 3, the laser sensor 140 may scan the inner surface 50 at the identified target area to acquire various data for the particular tire 10 including, for example, the relative location of the target area along inner surface 50, the shape of inner surface 50, the presence of raised features or depressions at the target area along inner surface 50, and/or other data important to determining a treatment path (e.g., a grinding path for grind unit 135) during the intended treatment operation. The present invention is not limited to the use of a laser sensor for surface measuring device 140. Other surface measuring devices may be used including, for example, a mechanical device such as a finger, probe, or wheel that is moved across inner surface 50 to map and/or scan its shape and location.

Figure 5:
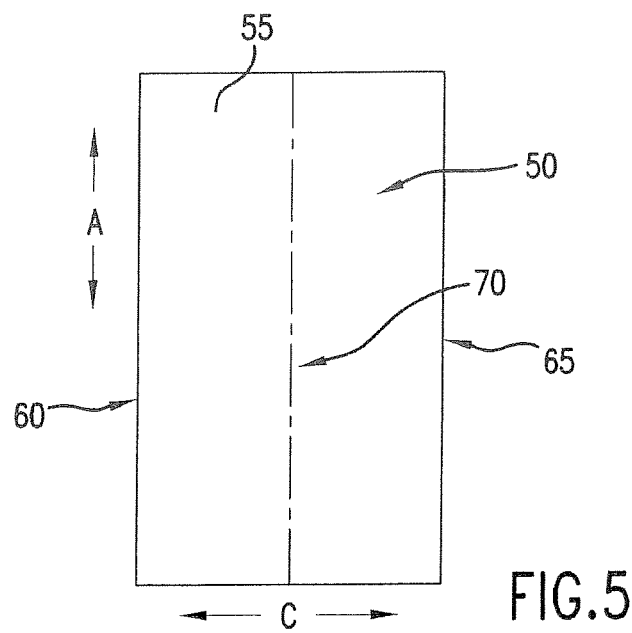
FIG. 5 illustrates one example of a target area. Other shapes with varying dimensions over a variety of depths may also be used.

A variety of techniques may be used for scanning inner surface 50 depending upon the amount or type of information desired and the particular measuring device 140 employed. Referring now to FIG. 5, surface measuring device 140 may be used to scan the entire inner surface 50 of the target area 55. Alternatively, surface measuring device 140 might sample only representative data from various locations at the target area. For example, device 140 might be used to scan only the outer boundaries 60 and 65 of the target area and/or only certain positions within the target area. Various algorithms may then be applied to provide a representative topography or scanning of the target area. In one exemplary technique, the boundaries 60 and 65 (located at two different circumferential positions of the target area 55) are scanned by moving the surface measuring device 140 in the axial directions A along each of boundaries 60 and 65 to provide a surface profile for each such boundary 60 and 65. Linear interpolation between the two profiles (adjusted for the skew, if any, of the tire) may be used to provide representative data regarding the inner surface of the tire at the target area 55. In another exemplary technique, the boundaries 60 and 65 as well as the center line 70 of the target area 55 are scanned and then averaged or interpolated. Using the teachings disclosed herein, one of skill in the art will understand that other techniques may be employed as well. As mentioned, the surface measuring device 140 may also determine whether tire 10 is skewed i.e., whether the inner surface 50 is not at a substantially uniform distance from axis Z-Z about the circumference of tire 10. Knowing whether tire 10 is skewed can be particularly important to providing a grinding path that removes a substantially uniform amount of material at the target area.

In order to provide for the repeatable, accurate scanning with surface measuring device 140 among tires differing in dimensions and shape between various models and sizes, it may be necessary to map a representative tire for each size and/or model so as to provide reference data for use by the controller. More specifically, in order to allow the controller to repeatedly position the surface measuring device 140 inside different sizes tires and to properly move the device 140 while scanning the target area, the controller may need to apply reference data including general physical information for the particular tire to be treated. For example, if device 140 is a laser sensor having a specific range limitation, such reference data allows the controller to position device 140 at least within range of the inside of a particular tire for purposes of then scanning that tire to acquire more detailed and specific information for use in determining a treatment path for treatment tool 135.

Figure 6:
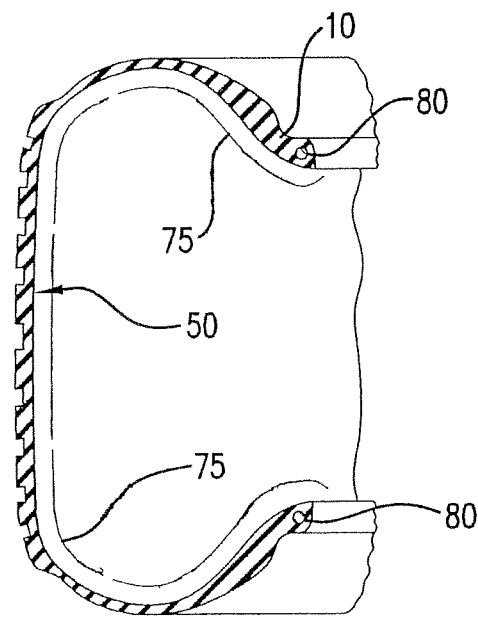
FIG. 6 is a cross-section view of a tire at particular circumferential position illustrating a mapping step.

Such mapping step may be accomplished using a variety of techniques, and an example of one such technique will be described using the cross-section of tire 10 as shown in FIG. 6. In order to acquire reference data for the particular size and model of tire 10, surface measuring device 140 maps the inside of tire 10 along five data profiles 75. More specifically, the inside surface 50 or tire 10 is divided into five data profiles 75 between beads 80 along a particular circumferential position of tire 10. Using dimensional information provided from, for example, structural drawings of tire 10, the controller moves sensing device 140 along each of the five data profiles 75 while device 140 collects information regarding the profile and/or location of the inside surface 50. If the measurement of a particular location falls outside the range of the sensing device 140, the machine searches for the inside surface 50 using positioning approximations until the sensing device 140 is back in range. The information is then stored or recorded for subsequent access during the scanning step as described above. Such mapping step can be performed for representative tire models and tire sizes for which patch applications are anticipated. Using the teachings disclosed herein, one skilled in the art will understand that other mapping steps may be used for purposes of providing reference data for different tires. By way of example, more or less than five data profiles 75 may be used in order to obtain representative data. As a further example, the reference data determined from the mapping step may include—for each tire size and model—the distance between the beads of the tire, the surface distance between the beads of the tire, the diameter of tire between the beads, the diameter of the tire at the inner surface 50 in the crown region of the tire, the diameter of the tire, and/or other dimensional data.

Accordingly, an exemplary method for treating a target area on the inner surface 50 of tire 10 will now be described with reference to all figures. As previously described, tire 10 is substantially centered upon rotatable tire support 105 using pins 110. The target area identified for treatment (e.g., grinding) is positioned above or adjacent to reference line 30 and between clamps 116 and 117. Of course, the target area can be located elsewhere and then rotated into the desired position by tire support 105. Clamps 115-117 are adjusted to secure tire 10 into place, and clamps 116 and 117 open up the inside of tire 10 by pulling bead 40 towards tire support 105 as shown in FIGS. 2, 3, and 4. Pulling bead 40 as described facilitates positioning and operation of the treatment tool such as grind unit 135 and/or the surface measuring device 140 inside tire 10.

Reference data regarding the particular size and model of tire 10 may be provided to a controller (e.g., a computer) that operates transport device 120 and tire support 105. An operator may, for example, manually enter dimensional data regarding tire 10. Alternatively, the reference data may be stored electronically from the mapping step described above and then provided to the controller upon the operator identifying the tire size and model. As previously indicated, the reference information allows the controller to accurately move transport device 120 along tracks 125 and 130 so as to place the surface measuring device 140 inside tire 10 and in the proximity of inner surface 50, preferably near the center of the crown region as shown in FIG. 3. From this center position, surface measuring device 140 is then used to collect information regarding whether the tire is skewed such that corrections must be included when determining a treatment path for treatment tool 135.

Typically, additional information provided to the controller will include the size and shape of the target area desired for grinding, the location of the target area relative to e.g., the beads of tire 10, and the depth to be ground at the target area. Other parameters for controlling the grinding operation may be specified such as whether to grind in layers, the speed of the grinder (rotational speed and/or grind path speed), and the amount of overlap between grinding passes. Dimensional information about grind unit 135, such as its physical dimensions including the width and shape of the abrasive surface employed, the coarseness of the abrasive material, and other information may also be provided to the controller for use in determining the proper grinding path. Because of the precise movements and control of the abrasive surface that can be obtained with the present invention, a coarser abrasive tool may be used than was previously practical in manual grinding operations. For example, an abrasive wheel with coarseness MCM-90, coated by L.R. Oliver & Company, Inc. of Cottrellville, Mich., was repeatedly employed with an exemplary embodiment of the present invention.

Once in position inside tire 10 as shown in FIG. 3, surface measuring device 140 then moves to the identified target area. Using reference data from the mapping step, the surface measuring device 140 is then moved along the previously mapped profile to scan the target area as already described above so as to determine e.g., the profile of the inner surface 50, the relative position of the inner surface 50, and/or the presence of other features on the inner surface 50 at the target areas. Using this data regarding the inner surface 50 in conjunction with other information previously described, the controller then determines a treatment path. More specifically, where a grinding tool 135 is being using for treatment, the controller determines the precise, coordinated movements of transport device 120, rotation of tire support 105, and rotation G about axis 145 that will grind the target area of the inner surface 50 as desired.

Surface measuring device 140 is rotated about axis 145 to place grinding unit 135 into position relative to the inner surface 50. The grind unit 135 is activated so that the grinder rotates as illustrated by arrow L in FIG. 4. Although shown in a counterclockwise rotation L, grind unit 135 may be rotated in either direction for grinding. Upon being placed into contact with inner surface 50, material is removed from inner surface 50. The controller then moves the transport device 120 and/or rotates the grind unit 135 about axis 145 according to the predetermined grinding path. In addition, tire support 105 may also be simultaneously rotated in order to maintain the predetermined grinding path while the grind unit 135 is grinding material from tire 10.

For example, in order to obtain a predetermined shape for the target area (e.g., rectangular on a toroid surface), it may be necessary that tire 10 is also rotated during grinding operations according to the position of the grind unit 135 relative to the target area and the distance of the grind unit 135 from the center of tire 10. This simultaneous rotation of tire 10 about axis ZZ, rotation of grind unit 135 about axis 145, and movement of transport device 120 along tracks 125 and 130 allows multiple variations in the geometry of the material ground from the target area including variations in size, shape, location, uniformity, and thickness. Alternatively, the grinding path can include other variations that do not require such simultaneous movements. For example, once the removal of material is completed at a particular circumferential position on the inner surface of tire 10, the controller can rotate tire support 105. At this new circumferential position, the controller then again moves the transport device 120 and/or rotates the grind unit 135 about axis 145 according to the predetermined grinding path. The grind unit 135 may be also be lifted from and then reapplied to inner surface 50 during grinding operations if desired. Regardless, these steps can be repeated until the desired grinding operation is completed. Using the teachings disclosed herein, one of skill in the art will understand that other variations in the method of grinding are within the scope of the present invention.

Finally, the physical dimensions of grinding unit 135 also help determine the circumferential width of material ground from the target area and may be included in determining the desired grinding path for the target area. For example, the shape, width, and/or diameter of a grinding wheel or other abrasive surface may be considered in determining the grinding path. Once grinding operations are completed, the controller moves the transport device 120 so as to remove grinding unit 135 and surface measuring device 140 from inside the tire 10. Again, variations in the particular sequence of movements of the grind unit 135 may also be used in accordance with the present invention as will be understood by one skilled in the art using this exemplary description.

The present invention also includes software e.g., a computer program for operating a machine according to the exemplary methods described above. For example, a computer program may be embodied on a computer readable storage medium provided to store instructions for operating the machine. Such program could include, for example, identifying instructions for identifying the target area 55 for preparing that is located on the inner surface 50 of tire 10. Scanning instructions would be provided for scanning the target area 55 so as to acquire data regarding the inner surface 50 of the tire 10 at the target area 55. Determining instructions in the program would provide for determining a treatment path using the data regarding the inner surface 50 of the tire 10. The program would include treating instructions for treating the inside of the tire 10 using a treatment tool 135 as described above. Positioning instructions would provide for positioning the treatment tool 135, using e.g., transport device 120, along the treatment path during the treating step.

Variations and additional steps may be provided with the program to operate the machine according to the exemplary methods already described above. For example, the scanning instructions could include instructions for providing least two parallel scans across the inside surface 50 of the tire 10 with linear interpolation between those scans to provide a representative topography. Mapping instructions could also be provided for determining reference physical data for a typical tire as set forth above.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for preparing the inside of a tire, the tire having an inner surface, the method comprising the steps of:
   locating the tire on a tire support;
   identifying a target area for preparing that is located on the inner surface of the tire;
   scanning the target area so as to acquire data regarding the inner surface of the tire at the target area;
   determining a treatment path over the inner surface of the tire using the data regarding the inner surface of the tire from said scanning step;
   treating the target area on the inner surface of the tire by removing material using a treatment tool; and
   positioning the treatment tool along the treatment path during said treating step.

2. A method for preparing the inside of a tire as in claim 1, further comprising the steps of:
   clamping the tire to a tire support; and
   spreading at least one bead of the tire.

3. A method for preparing the inside of a tire as in claim 2, the clamping step further comprising inserting a shim between the tire and the tire support wherein a surface of the shim in contact with the tire is angled outward in relation to the tire, whereby an additional bead spreading is obtained.

4. A method for preparing the inside of a tire as in claim 1, wherein said positioning step further comprises rotating the tire.

5. A method for preparing the inside of a tire as in claim 1, wherein said step of determining a treatment path further comprises applying dimensional information regarding a patch to be applied to the inside of the tire at the target area.

6. A method for preparing the inside of a tire as in claim 1, further comprising the step of acquiring data regarding the physical dimensions of the tire.

7. A method for preparing the inside of a tire as in claim 1, wherein said identifying a target area step comprises specifying a distance from at least one bead of the tire.

8. A method for preparing the inside of a tire as in claim 1, the method further comprising the step of mapping so as to provide dimensional information regarding the tire for use during said scanning step.

9. An apparatus for preparing the inside of a tire, the tire defining circumferential directions, the apparatus comprising:
   a treatment tool configured to modify an inner surface along the inside of the tire at a target area;
   a surface measuring device equipped to provide information regarding the inner surface of the tire;
   a transport device configured to carry and position said treatment tool and said surface measuring device relative to the inner surface of the tire;
   a tire support configured for receipt of the tire, said tire support rotatable along a circumferential direction of said tire; and
   a clamp to locate a tire on said tire support.

10. An apparatus for preparing the inside of a tire as in claim 9, wherein the clamp is configured to locate the tire on said tire support and to spread at least one bead of the tire.

11. An apparatus for preparing the inside of a tire as in claim 9, further comprising a shim between the tire and the tire support wherein a surface of the shim which contacts the tire is angled outward in relation to the tire, whereby an additional bead spreading is obtained.

12. An apparatus for preparing the inside of a tire as in claim 9, wherein said treatment tool and said surface measuring device are rotatable about an axis carried by said transport device.

13. An apparatus for preparing the inside of a tire as in claim 9, further comprising a controller for determining the movement of said transport device and said rotatable tire support during treatment operations.

14. An apparatus for preparing the inside of a tire as in claim 13, wherein said controller is configured for receipt of data regarding physical dimensions of the tire acquired by said surface measuring device.

15. An apparatus for preparing the inside of a tire as in claim 13, wherein said controller is configured for determining a treatment path from information comprising measurements taken by said surface measuring device.

16. A computer program product including instructions embodied on a computer readable storage medium, the computer program product acting to prepare the inside of a tire, the tire having an inner surface, the computer program comprising:
   identifying instructions to identify a target area for preparing that is located on the inner surface of the tire;
   scanning instructions to scan the target area so as to acquire data regarding the inner surface of the tire at the target area;
   determining instructions to determine a treatment path over the inner surface using the data regarding the inner surface of the tire obtained from scanning the target area;
   treating instructions to treat the target area of the inner surface using a treatment tool; and
   positioning instructions to position the tool along the treatment path during said treating step.

17. A computer program product as in claim 16, wherein said scanning instructions further comprise instructions for at least two parallel scans across the inside surface of the tire.

18. A computer program product as in claim 16, where said scanning instructions further comprise instructions for interpolation between said at least two parallel scans.

19. A computer program product as in claim 16, further comprising mapping instructions for determining reference physical data for a typical tire.

* * * * *